US011970898B2

(12) United States Patent
Gokan et al.

(10) Patent No.: US 11,970,898 B2
(45) Date of Patent: Apr. 30, 2024

(54) DRIVE UNIT FOR A SLIDING CLOSURE (71) Applicant: MITSUBA Corporation, Gunma (JP)

(72) Inventors: Ryo Gokan, Gunma (JP); Yoshitaka Urano, Gunma (JP)

(73) Assignee: MITSUBA Corporation, Gunma (JP)

( * ) Notice: Subject to any disclaimer, the term of this patent is extended or adjusted under 35 U.S.C. 154(b) by 121 days.

(21) Appl. No.: 17/428,983

(22) PCT Filed: Feb. 13, 2020

(86) PCT No.: PCT/JP2020/005557
§ 371 (c)(1),
(2) Date: Aug. 6, 2021

(87) PCT Pub. No.: WO2020/184046
PCT Pub. Date: Sep. 17, 2020

(65) Prior Publication Data
US 2022/0136314 A1 May 5, 2022

(30) Foreign Application Priority Data
Mar. 13, 2019 (JP) .................... 2019-045457

(51) Int. Cl.
*E05F 15/643* (2015.01)
*B60J 5/04* (2006.01)
(Continued)

(52) U.S. Cl.
CPC .......... *E05F 15/643* (2015.01); *B60J 5/047* (2013.01); *B60J 5/06* (2013.01); *E05F 15/662* (2015.01);
(Continued)

(58) Field of Classification Search
CPC ....... E05F 15/662; E05F 15/643; B60J 5/047; B60J 5/06
See application file for complete search history.

(56) References Cited

U.S. PATENT DOCUMENTS 5,884,433 A 3/1999 Watanabe et al.
2015/0251525 A1* 9/2015 Atomura ............... E05F 15/646
49/360
(Continued)

FOREIGN PATENT DOCUMENTS

CN 101235696 8/2008
CN 202831977 3/2013
(Continued)

OTHER PUBLICATIONS

"Written Opinion of the International Searching Authority (Form PCT/ISA/237) of PCT/ JP2020/005557," dated Mar. 17, 2020, with English translation thereof, pp. 1-7.
(Continued)

Primary Examiner — Gregory J Strimbu
(74) Attorney, Agent, or Firm — JCIPRNET (57) ABSTRACT A drive unit for driving an open-and-close body and a method for attaching the drive unit to the open-and-close body. The drive unit includes a cable, a drum, a pulley, a fix member, an elastic member, and a limiting member. The cable has a portion connected to the open-and-close body and another portion wound on the drum. The pulley is movable between a first position, where the pulley does not tension the cable, and a second position, where the pulley engages the cable and applies tension to the cable. The fix member is capable of fixing the pulley in the first position. The elastic member urges the pulley towards the second position. The limiting member is provided between the drum and the fix member, and the limiting member allows or limits rotation of the drum in accordance with the position of the pulley.

4 Claims, 8 Drawing Sheets (51) Int. Cl.
  *B60J 5/06* (2006.01)
  *E05F 15/662* (2015.01)
(52) U.S. Cl.
  CPC ... *E05Y 2201/418* (2013.01); *E05Y 2201/434* (2013.01); *E05Y 2201/474* (2013.01); *E05Y 2201/654* (2013.01); *E05Y 2201/664* (2013.01); *E05Y 2201/668* (2013.01); *E05Y 2600/50* (2013.01); *E05Y 2900/531* (2013.01)

(56) References Cited

U.S. PATENT DOCUMENTS

| | | | | |
|---|---|---|---|---|
| 2017/0130507 | A1* | 5/2017 | Uchitsunemi | E05F 15/643 |
| 2021/0213811 | A1* | 7/2021 | Ishigaki | E05F 15/646 |

FOREIGN PATENT DOCUMENTS

| | | |
|---|---|---|
| CN | 104736786 | 6/2015 |
| CN | 109072659 | 12/2018 |
| JP | 2000008708 | 1/2000 |
| JP | 3195736 | 8/2001 |
| JP | 2003328639 | 11/2003 |
| JP | 2006083530 | 3/2006 |
| JP | 2009019396 | 1/2009 |
| JP | 2009167632 | 7/2009 |
| JP | 2011074564 | 4/2011 |
| JP | 2015137533 | 7/2015 |
| JP | 2016006334 | 1/2016 |

OTHER PUBLICATIONS

"International Search Report (Form PCT/ISA/210) of PCT/JP2020/005557," dated Mar. 17, 2020, with English translation thereof, pp. 1-4.

"Office Action of China Counterpart Application", dated Apr. 21, 2022, with English translation thereof, p. 1-p. 10.

* cited by examiner

FIG. 3
[Pulley locked state]

DRIVE UNIT FOR A SLIDING CLOSURE

BACKGROUND OF THE INVENTION

Field of the Invention

The invention relates to a drive unit driving in a manner of opening or closing an open/close body and a method for attaching the drive body.

Description of Related Art

On the side part of a vehicle such as a one-box vehicle, an opening part for a passenger to get on or off and to load and unload luggage is provided. The opening part is a relatively large opening and is opened or closed by a slide door including a roller assembly. Since the slide door is heavy, a slide door open/close mechanism which may automatically open/close the side door is mounted in a vehicle including the slide door.

The slide door open/close mechanism includes a drive unit. In the drive unit, a close side cable and an open side cable to pull the slide door in a close direction and an open direction. The drive unit includes a drum about which the close side cable and the open side cable are wound in directions opposite to each other, and the close side cable or the open side cable is driven by forwardly and reversely rotating the drum. Accordingly, the slide door is opened or closed.

Such a drive unit is described in Patent Document 1, for example. The drive unit described in Patent Document 1 is provided with a tensioner mechanism applying tension to a cable. The tensioner mechanism is accommodated in a housing, and a stopper setting the tensioner mechanism in the housing to a locked state is provided. Then, by operating the stopper to set the tensioner mechanism to the locked state, the cable is loosened, so the drive unit can be attached to the vehicle body.

PRIOR ART DOCUMENT

Patent Document

Patent Document 1: Japanese Laid-open No. 2015-137533

SUMMARY OF THE INVENTION

Problems to be Solved by the Invention

However, in the drive unit described in Patent Document 1, in the state where the tensioner mechanism is set to the locked state to loosen the cable, that is, in the state before the drive unit is attached to the vehicle body, the drum about which the cable is wound is rotatable. Therefore, for example, when the drum rotates due to vibration, etc., during transportation of the drive unit alone, it is possible that the cables may be loosened and caught in other parts constituting the tension mechanism. Accordingly, there is a concern that the operability of attaching the drive unit to the vehicle body may be reduced.

The objective of the invention is to provide a drive unit and a method for attaching the drive unit capable of improving the operability of attaching the drive unit to an attachment object.

Means for Solving Problems

A drive unit driving in a manner of opening or closing an open/close body according to the invention includes: a cable, pulling the open/close body; a drum, about which a side of the cable opposite to a side of the open/close body is wound; a pulley, provided between the open/close body and the drum, changing a direction of the cable, and being movable between a first position and a second position; a fix member, capable of fixing the pulley at the first position and loosening the cable at a time when the pulley is fixed at the first position; an elastic member, pressing in a manner of positioning the pulley to the second position and applying tension to the cable; and a limiting member, provided between the drum and the fix member, and allowing or limiting rotation of the drum. The limiting member limits the rotation of the drum at the time when the fix member fixes the pulley at the first position, and allows the rotation of the drum at a time when the elastic member moves the pulley to the second position.

According to another aspect of the invention, an engagement convex part engaged with an engagement concave part provided in the drum is provided at an end of the limiting member near the drum, a press part pressed by the fix member is provided at another end of the limit member near the fix member, and at a time when the press part is pressed by the fix member to move the limiting member, engagement between the engagement convex part and the engagement concave part is canceled to allow the rotation of the drum.

According to another aspect of the invention, the drive unit is further provided with a housing accommodating the limiting member, a holding mechanism is provided between the housing and the limiting member, and the holding mechanism is capable of respectively holding the limiting member to a first state in which the rotation of the drum is limited or a second state in which the rotation of the drum is allowed.

The invention provides a method for attaching a drive unit driving in a manner of opening or closing an open/close body. The drive unit includes: a cable, pulling the open/close body; a drum, about which a side of the cable opposite to a side of the open/close body is wound; a pulley, provided between the open/close body and the drum, changing a direction of the cable, and being movable between a first position and a second position; a fix member, capable of fixing the pulley at the first position and loosening the cable at a time when the pulley is fixed at the first position; an elastic member, pressing in a manner of positioning the pulley to the second position and applying tension to the cable; and a limiting member, provided between the drum and the fix member, and allowing or limiting rotation of the drum. The method includes: a first process of operating the fix member in a direction to fix the pulley at the first position, and moving the limiting member in the direction to limit the drum to a state in which the rotation of the drum is limited; a second process of attaching the drive unit to an attachment object and connecting an end part of the cable loosened during the first process to the open/close body; and a third process of operating the fix member in an other direction to move the pulley to the second position by an elastic force of the elastic member, and moving the limiting member to the other direction to come to a state in which the rotation of the drum is allowed.

According to another aspect of the invention, in the third process, the limiting member is also moved in the other direction in association with an operation of the fixing member to the other direction.

[Inventive Effects]

According to the invention, the limiting member limits the rotation of the drum at the time when the fix member fixes the pulley at the first position, and allows the rotation of the drum at the time when the elastic member moves the pulley to the second position. Therefore, in the state before the drive unit is attached to the attachment object, the drum can be prevented from moving. Accordingly, it is possible to prevent the cables inside the housing from loosening and catching on other constituent components. Accordingly, it is possible to improve the operability of attaching the drive unit to the attachment object.

DESCRIPTION OF THE EMBODIMENTS

In the following, an embodiment of the invention is described in detail by using the drawings.

Figure 1:
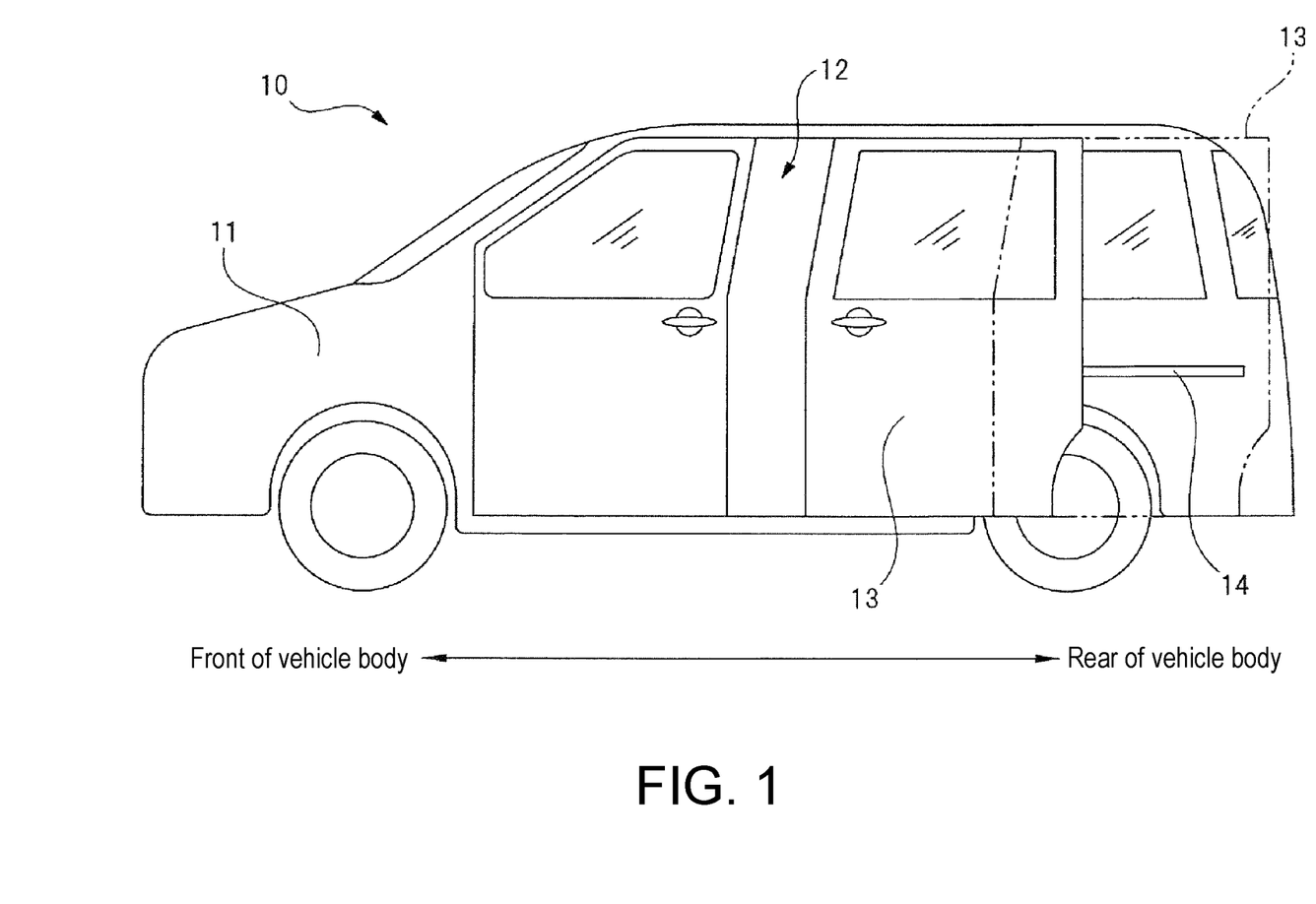
FIG. 1 is a schematic view illustrating a vehicle in which a drive unit is mounted.
Figure 2:
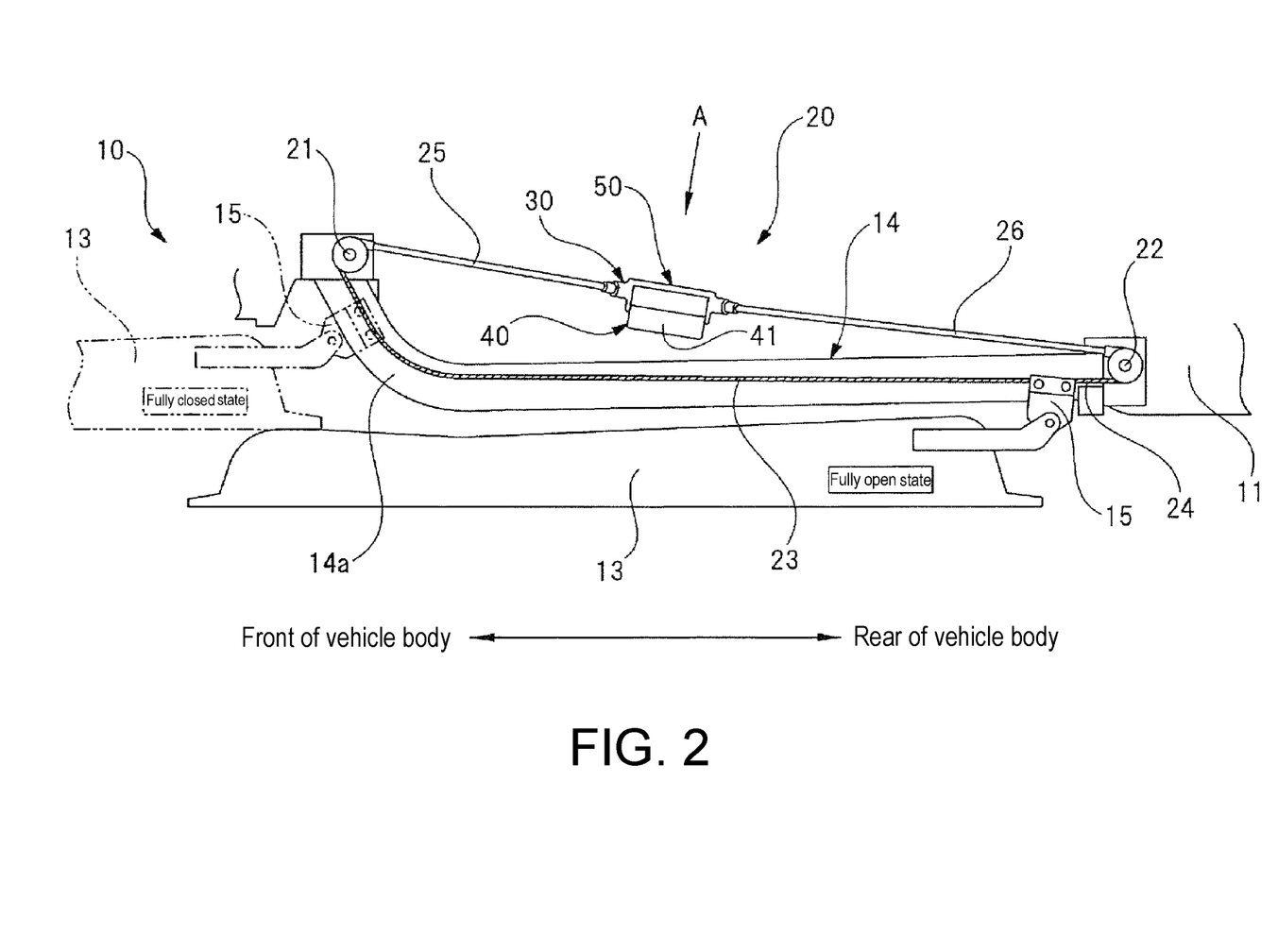
FIG. 2 is an explanatory view illustrating a structure for attaching a slide door to a vehicle body.
Figure 3:
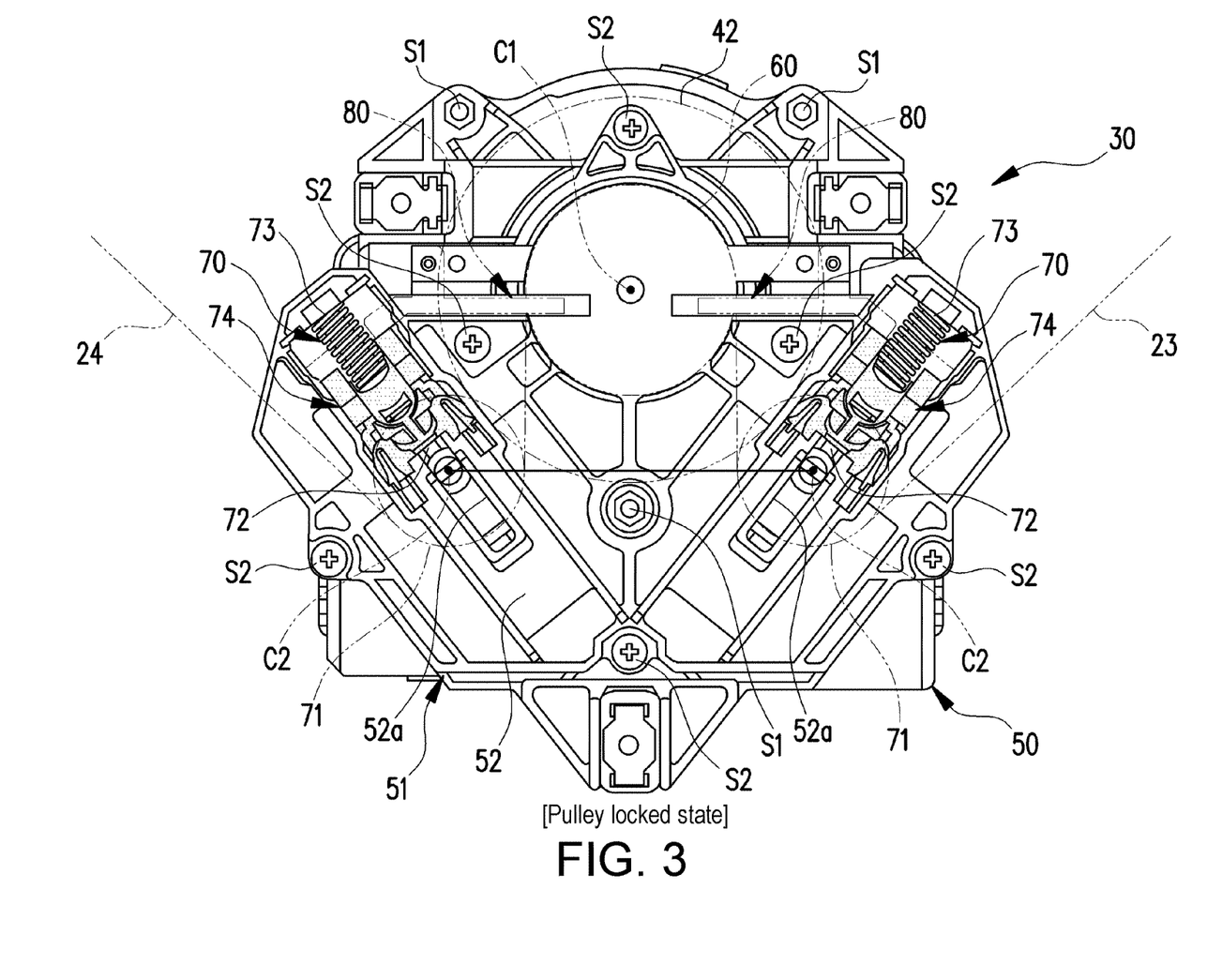
FIG. 3 is a view illustrating a drive unit alone when viewing from an arrow A of FIG. 2.
Figure 4:
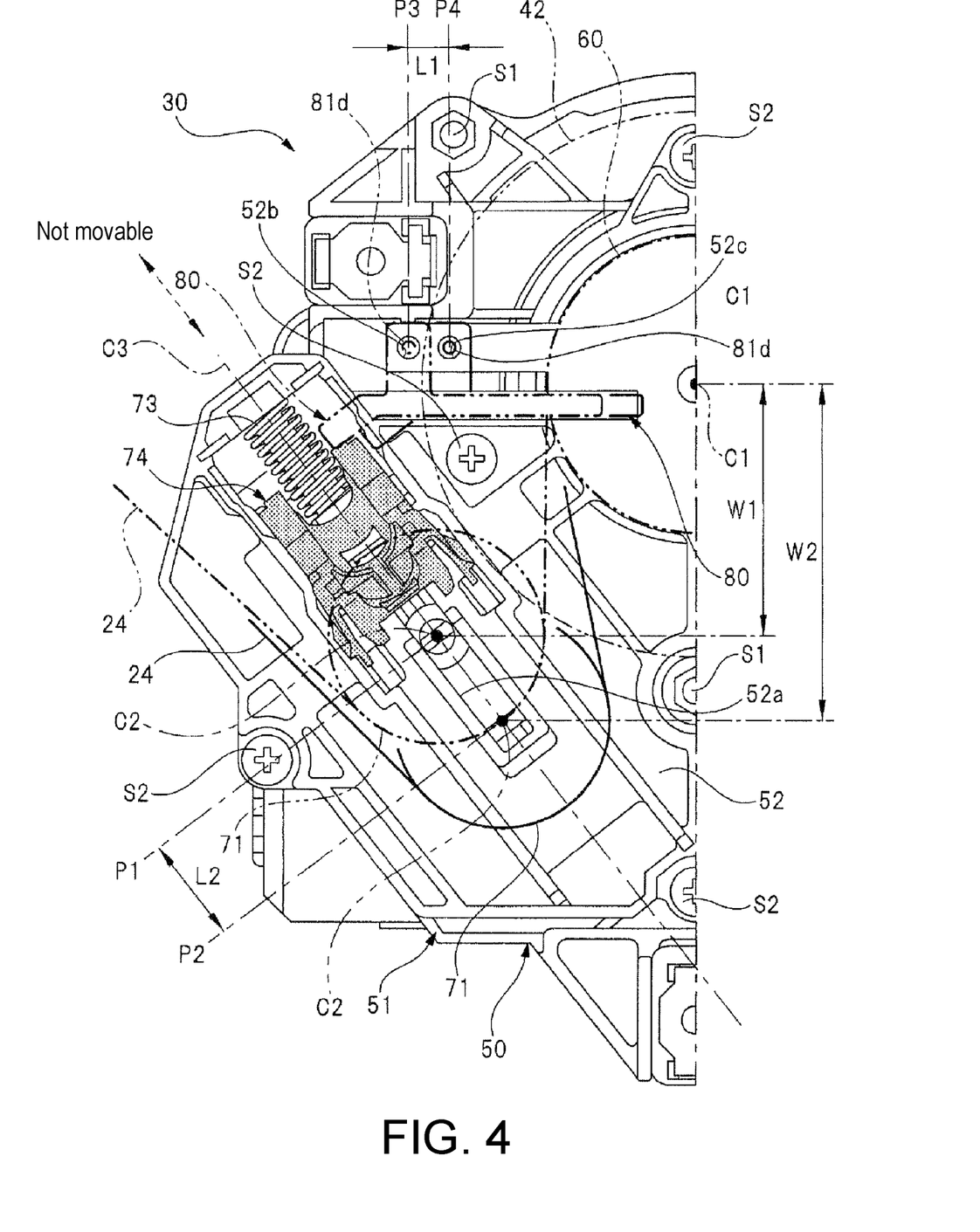
FIG. 4 is an enlarged view in which a half of the drive unit of FIG. 3 is enlarged.
Figure 5:
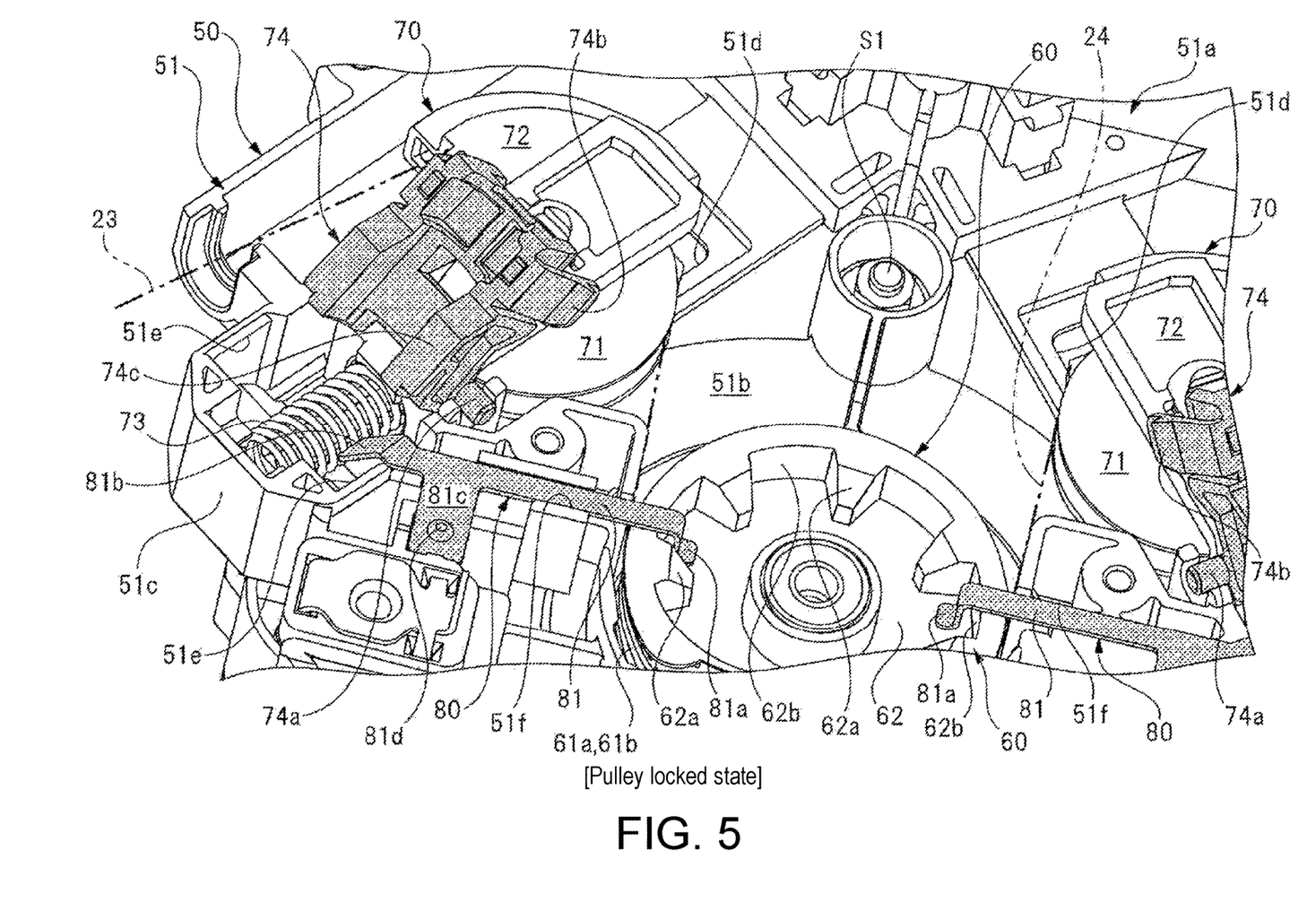
FIG. 5 is an enlarged perspective view illustrating a periphery of a tensioner mechanism (without a cover).
Figure 6:
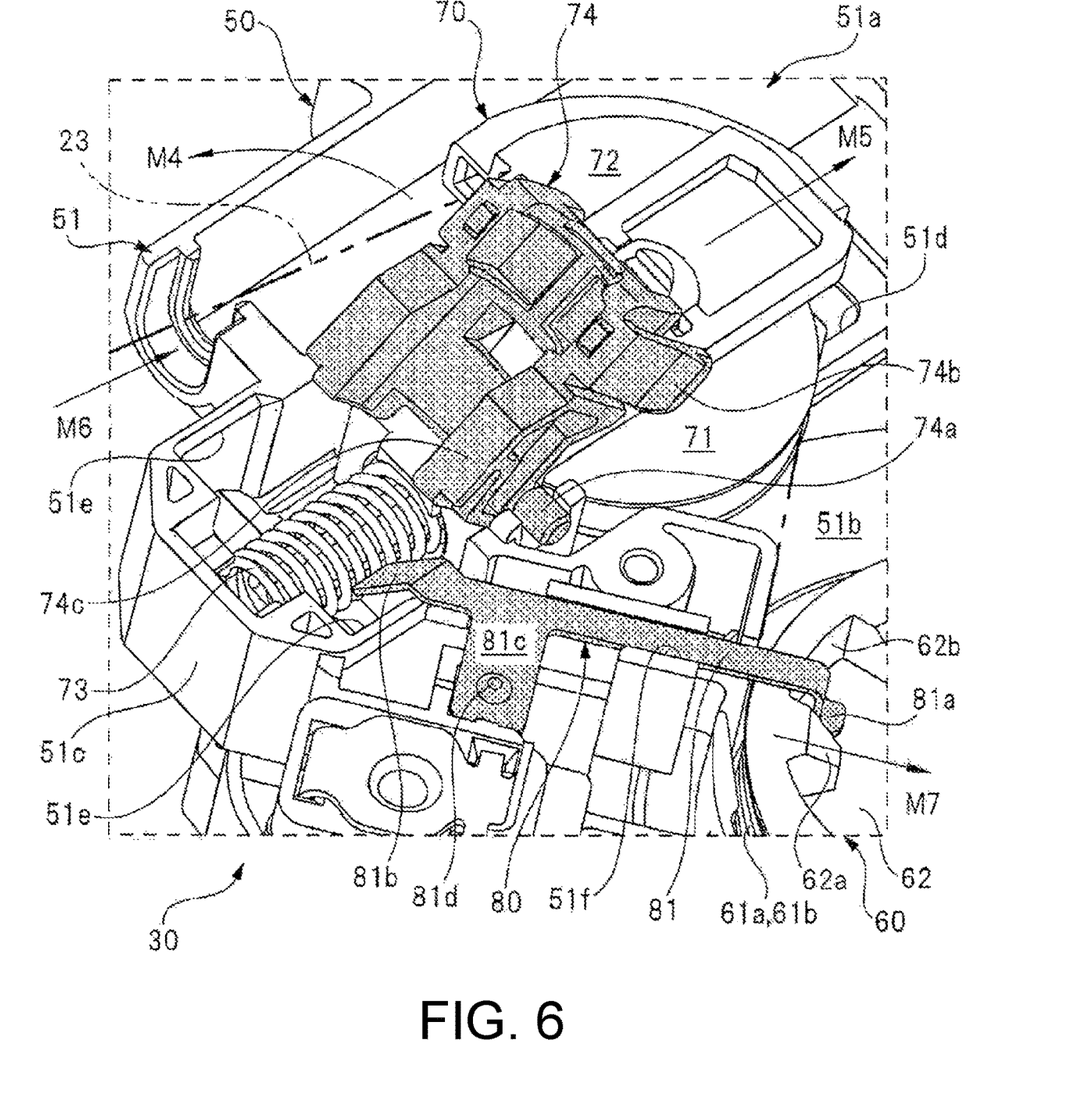
FIG. 6 is an explanatory view illustrating operations of a fix member and a limiting member.
Figure 7:
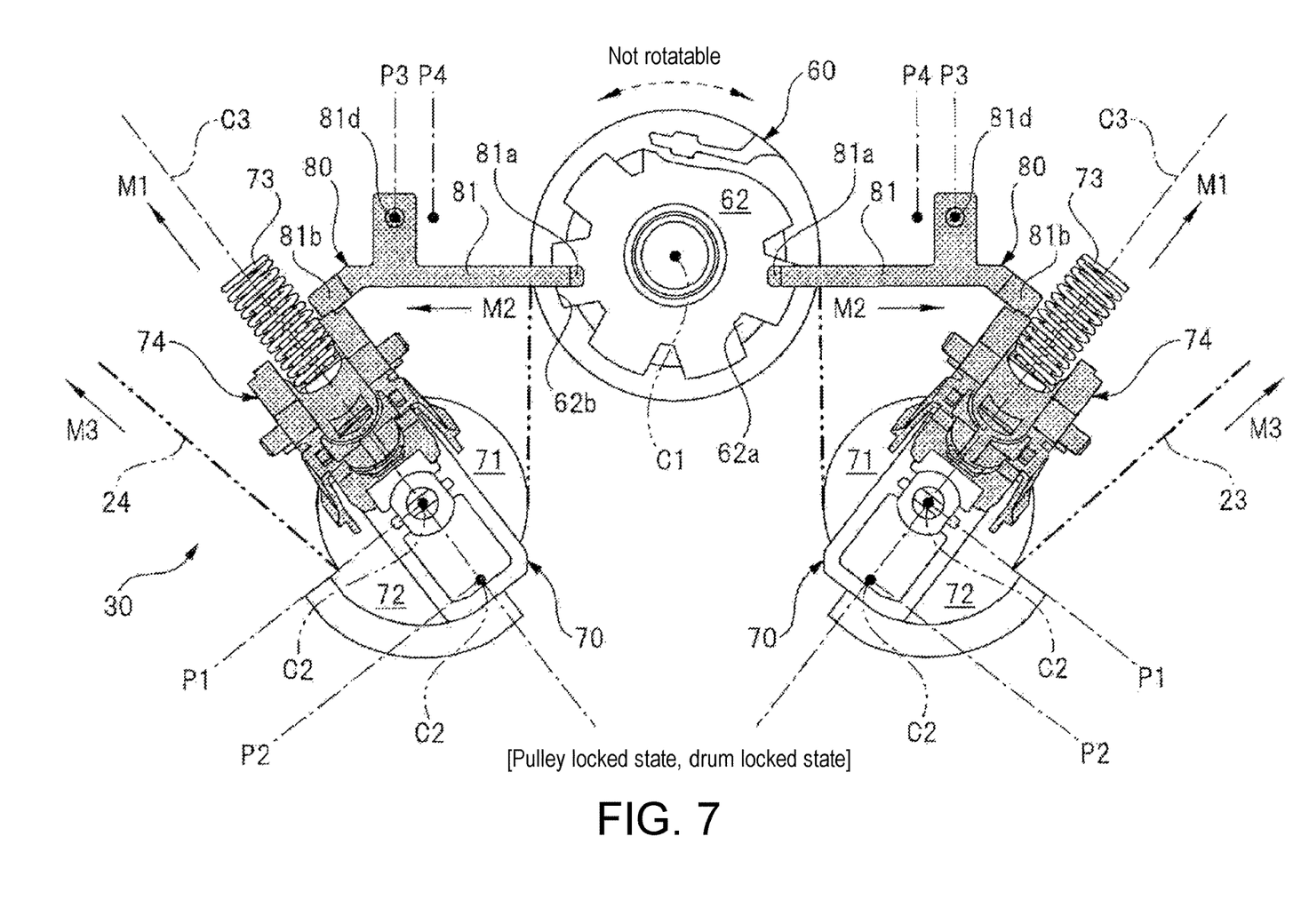
FIG. 7 is an explanatory view illustrating a state in which a drum is locked.
Figure 8:
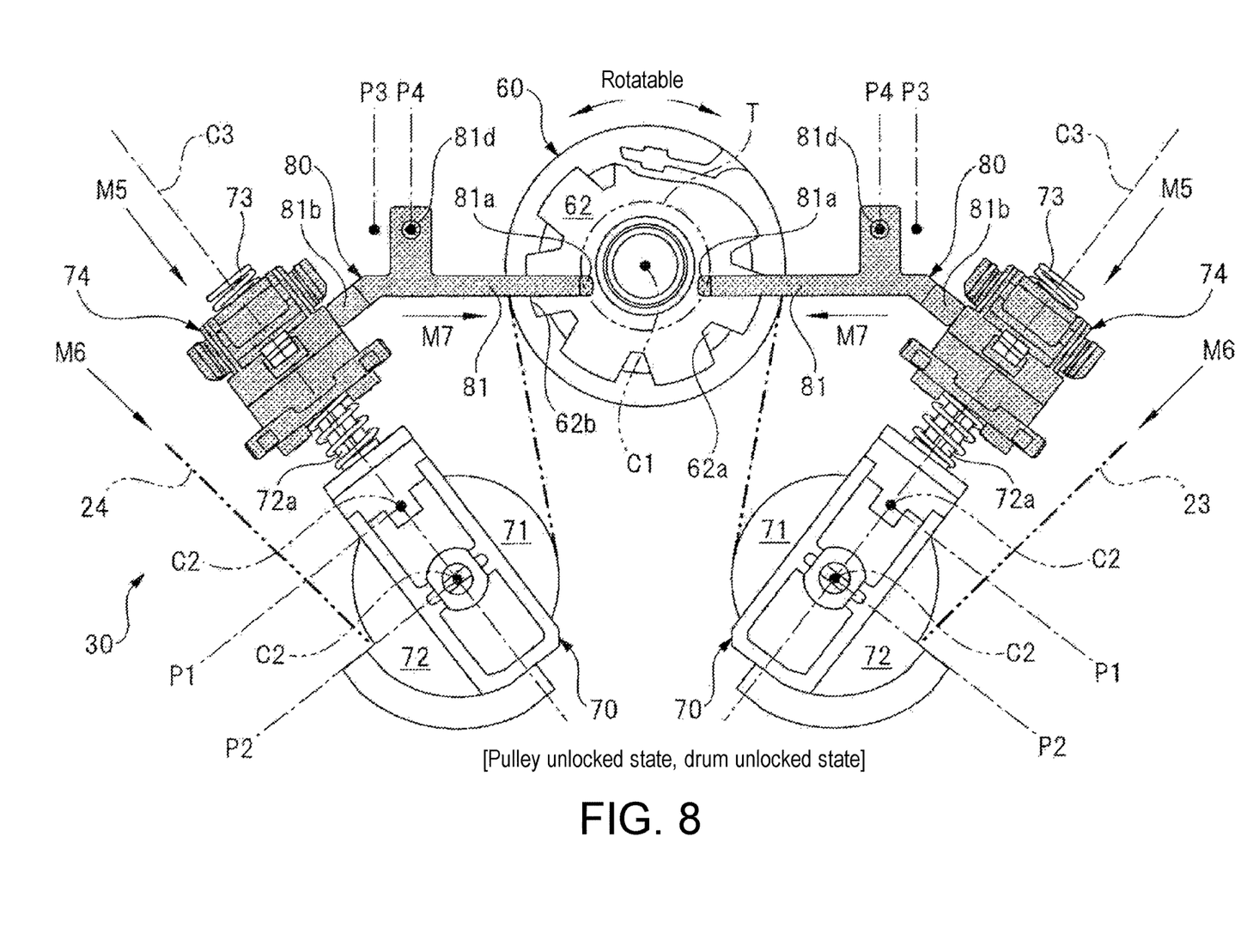
FIG. 8 is an explanatory view illustrating a state in which a drum is unlocked.

FIG. 1 is a schematic view illustrating a vehicle in which a drive unit is mounted; FIG. 2 is an explanatory view illustrating a structure for attaching a slide door to a vehicle body; FIG. 3 is a view illustrating a drive unit alone when viewing from an arrow A of FIG. 2; FIG. 4 is an enlarged view in which a half of the drive unit of FIG. 3 is enlarged; FIG. 5 is an enlarged perspective view illustrating a periphery of a tensioner mechanism (without a cover); FIG. 6 is an explanatory view illustrating operations of a fix member and a limiting member; FIG. 7 is an explanatory view illustrating a state in which a drum is locked; and FIG. 8 is an explanatory view illustrating a state in which a drum is unlocked.

A vehicle 10 shown in FIG. 1 is, for example, a wagon able to accommodate eight people. On the side part of a vehicle body 11 of the vehicle 10, an opening part 12 which is relatively large is formed. The opening part 12 is formed by opening or closing a slide door (open/close body) 13 movably provided in the vehicle body 11. The slide door 13 is guided by a guide rail 14 fixed to the side part of the vehicle body 11 and moves in a front-rear direction of the vehicle body 11 between a fully closed position and a fully open position. In addition, by moving the slide door 13 to the fully open position (two-dot chain line in the figure), the opening part 12 is formed to be large, so that the passengers can get on/off and luggage can be loaded and unloaded easily.

As shown in FIG. 2, on the vehicle body rear side of the slide door 13, a roller assembly 15 is provided at the center part in the upper-lower direction of the slide door 13. The roller assembly 15 moves on the guide rail 14 along the shape of the guide rail 14. Accordingly, the slide door 13 moves in the front-rear direction of the vehicle body 11 along the side part of the vehicle body 11.

On the vehicle front side of the guide rail 14, a curved part 14a curved toward the compartment inner side (upper side in the drawing) is provided. In addition, when the roller assembly 15 moves toward the vehicle body front side and moves toward the vehicle compartment inner side through a portion of the curved part 14a, the slide door 13 is closed. Specifically, as shown in the two-dot chain line in the figure, the slide door 13 is pulled inside the vehicle body 11 to come to a "fully closed state" and substantially flush with the side surface of the vehicle body 11.

In addition to the roller assembly 15, the slide door 13 is provided with roller assemblies (not shown) on the vehicle body front side and the upper and lower portions, respectively. In addition, in correspondence with roller assemblies of the upper and lower portions of the slide door 13, guide rails (not shown) are also respectively provided on the upper and lower portions of the side part in the vehicle body 11. That is, the slide door 13 is supported at a total of three places with respect to the vehicle body 11. Accordingly, it is possible to perform an open/close operation stably with respect to the vehicle body 11.

As shown in FIG. 2, on the side part in the vehicle body 11 of the vehicle 10, a slide door open/close mechanism 20 automatically opening or closing (driving) the slide door 13 is mounted. The slide door open/close mechanism 20 includes a drive unit 30, and the drive unit 30 is fixed to a vehicle body panel (not shown) forming the vehicle body 11 and is adjacent to the central part of the guide rail 14 in the longitudinal direction.

The slide door open/close mechanism 20 includes a pair of inversion pulleys 21 and 22 respectively disposed on the two sides of the longitudinal direction of the guide rail 14, a close side cable (cable) 23 pulling the slide door 13 toward a close direction (the front of the vehicle body), and an open side cable (cable) 24 pulling the slide door 13 toward an open direction (the rear of the vehicle body).

Then, the end parts on a side of the pair of cables 23 and 24 in the longitudinal direction are respectively connected to the roller assembly 15 from the front of the vehicle body and the rear of the vehicle body via the pair of inversion pulleys 21 and 22. That is, the ends of the pair of cables 23 and 24 in the longitudinal direction are connected to the slide door 13, and the pair of cables 23 and 24 are respectively adapted to pull the slide door 13 in directions opposite to each other.

With respect to this, the other sides of the pair of cables 23 and 24 in the longitudinal direction, that is, the pair of cables 23 and 24 on the side opposite to the side of the slide door 13 are respectively guided into the drive unit 30. Then, the other sides of the pair of cables 23 and 24 in the longitudinal direction are wound about the drum 60 (see FIG. 5) provided inside the drive unit 30 in directions opposite to each other.

Accordingly, by forwardly driving the drive unit 30, the close side cable 23 is wound about the drum 60 to pull the slide door 30 in the close direction (left side in FIG. 2). At this time, opposite to the close side cable 23, the open side cable 24 is extended to the outside of the drive unit 30 from the drum 60. Meanwhile, by reversely driving the drive unit 30, the open side cable 24 is wound about the drum 60 to pull the slide door 30 in the open direction (right side in the figure). At this time, opposite to the open side cable 24, the close side cable 23 is extended to the outside of the drive unit 30 from the drum 60. By doing so, the drive unit 30 is configured to drive in a manner of opening or closing the slide door 13.

The portions of the pair of cables 23 and 24 disposed on the outside of the vehicle body 11 are hidden in a guide groove (not shown) provided inside the guide rail 14. Accordingly, the pair of cables 23 and 24 are not exposed to the outside. Thus, the appearance of the vehicle 10 is favorable, and the pair of cables 23 and 24 can be protected from rain or dust.

In addition, outer casings 25 and 26 covering the periphery of the pair of cables 23 and 24 and keep the pair of cables 23 and 24 respectively slidable are provided between the pair of inversion pulleys 21 and 22 and the drive unit 30. The outer casings 25 and 26 are flexible and are coated with sliding grease (not shown) on the inner sides of the outer casings 25 and 26. Accordingly, the pair of cables 23 and 24 can be protected and are slidable in the room inside the pair of outer casings 25 and 26.

As shown in FIG. 2, the drive unit 30 includes a motor part 40 and a drum part 50 integrated with each other by using three fastening members S1. In addition, the motor part 40 as well as the drum part 50 have a flat shape. Accordingly, the increase in the thickness dimension of the drive unit 30 along the axial direction of a rotation center C1 of the drum 60 can be suppressed. Therefore, the drive unit 30 can be easily arranged to the narrow interior (not shown) of the vehicle body panel forming the vehicle body 11.

The motor part 40 includes a motor housing 41 formed by a resin material such as plastics. As shown in FIG. 3, an electric motor 40 having a flat shape is accommodated in the motor housing 41. The electric motor 42 is a brushless motor and includes an annular stator and a rotor rotated inside the stator (neither of which is shown). Accordingly, the weight as well as the thickness of the motor part 40 can be reduced.

In addition, the rotor and the drum 60 are disposed coaxially with each other. Specifically, the rotation center of the rotor is consistent with the rotation center C1 of the drum 60. Accordingly, for example, by pulling one of the pair of cables 23 and 24 to apply an external force (rotation force) to the drum 60, the drum 60 is relatively easily rotated.

Between the rotor and the drum 60, a planetary gear mechanism (not shown) as a deceleration mechanism is disposed to be able to transmit power. That is, the planetary gear mechanism also operates by adopting the rotation center C1 as the center. Accordingly, by providing the planetary gear mechanism between the rotor and the drum 60, the high-speed rotation of the rotor is decelerated and the torque is increased. The rotation force whose torque has been increased is transmitted to the drum 60.

The drum part 50 includes a drum housing (housing) 51 formed by a resin material such as plastics and a plate-like drum cover (housing) 52 blocking a housing opening part 51a (see FIG. 5) of the drum housing 51. Here, the drum cover 52 is formed by a resin material such as plastics. Accordingly, the weight of the drum part 50 can be reduced. The drum cover 52 is fixed to the drum housing 51 by a total of six fastening members S2. Also, in FIGS. 5 and 6, the drum cover 52 is not shown in order to more easily illustrate the internal configuration of the drum part 50.

As shown in FIG. 3, the drum housing 51 is formed in a flat, substantially pot belly shape. In addition, as shown in FIG. 5, the drum housing 51 includes a bottom wall part 51b, and a sidewall part 51c standing upright on the periphery of the bottom wall part 51b. On the inner side formed by the drum housing 51 and the drum cover 52, the drum 60, a pair of tensioner mechanisms 70, and a pair of limiting members 80 are accommodated.

Here, the pair of tensioner mechanisms 70 are provided to respectively correspond to the pair of cables 23 and 24, and are formed in shapes same as each other. In addition, the pair of limiting members 80 are also provided to respectively correspond to the pair of cables 23 and 24 and are formed in shapes same as each other. Specifically, the pair of tensioner mechanisms 70 and the pair of limiting members 80 are provided on the left and right sides of FIGS. 3 and 5, with the drum 60 being the center, and are provided to be mirror-symmetric to each other.

The drum 60 is formed to be in a substantially columnar shape by a resin material such as plastics, and is rotatably provided, with the rotation center C1 (see FIGS. 3 and 4) being the center, in the substantial central portion of the drum housing 51. Specifically, the drum 60 is rotatably supported with respect to the motor shaft (not shown) of the electric motor 42 via a ball bearing (not shown).

In addition, as shown in FIG. 5, on the radially outer side of the drum 60, a pair of cable grooves 61a and 61b are provided to spirally extend in the axial direction of the drum 60. The pair of cables 23 and 24 are respectively wound in the cable grooves 61a and 61b. The depth dimension of the pair of cable grooves 61a and 61b is substantially the same as the diameter dimension of the pair of cables 23 and 24. Accordingly, the pair of cables 23 and 24 are reliably prevented from being detached from the pair of cable grooves 61a and 61b.

In addition, as shown in FIG. 5, a recess part 62 annularly recessed in the axial direction of the drum 60 is provided on one side of the axial direction of the drum 60, i.e., the side of the drum cover 52 (top side in the figure) along the axial direction of the drum 60. Then, on the radially outer side of the recess part 62, a total of six protrusion parts 62a (see FIGS. 7 and 8) are integrally provided to protrude toward the radially inner side of the recess part 62.

The protrusion parts 62a are provided at predetermined intervals in the circumferential direction of the drum 60, and engagement concave parts 62b recessed toward the radially outer side of the recess part 62 are provided between adjacent protrusion parts 62a in the circumferential direction of the drum 60. The engagement concave parts 62b are provided for an engagement convex part 81a of the limiting member 80 to be inserted. Then, when the engagement convex part 81a is inserted into and engaged with the engagement concave part 62b, the rotation of the drum 60 comes to a limited state. That is, the rotation of the drum 60 is in a "drum locked state" shown in FIG. 7. Comparatively, when the engagement convex part 81a is disentangled from the engagement concave parts 2b, the rotation of the drum 60 comes to an allowed state. That is, the rotation of the drum 60 comes to a "drum unlocked state" shown in FIG. 8.

As shown in FIGS. 3 and 6, the pair of tensioner mechanisms 70 are in the drum housing 51 and respectively disposed on the left and right sides of the drum 60 (see FIG. 3). The pair of tensioner mechanisms 70 include pulleys 71 respectively winding the pair of cables 23 and 24 and change the directions of the cables 23 and 24. Specifically, the pulleys 71 are formed by a resin material such as plastics, provided between the slide door 13 (see FIG. 2) and the drum 60, and disposed on the vehicle body lower side (lower side in FIG. 3) with respect to the drum 60. Accordingly, the pulleys 71 bend the pair of cables 23 and 24 respectively at an acute angle (about 50°).

In addition, the tensioner mechanism 70 includes a pulley support member 72 which rotatably supports the pulley 71. The pulley support member 72 is also formed by a resin material such as plastics. The pulley support member 72 is movable with respect to the drum housing 51 in an oblique upper-lower direction (the oblique upper-lower direction in FIG. 3) of the vehicle body.

Specifically, the pulley support member 72 is movably supported by a first guide groove 51d provided at the bottom wall part 51b of the drum housing 51 (see FIG. 5) and a second guide groove 52a provided at the drum cover 52 (see FIG. 4). The first guide groove 51d is configured by a concave part recessed in the plate thickness direction of the bottom wall part 51b, and the second guide groove 52a is configured as a through hole penetrating through the plate thickness direction of the drum cover 52. Accordingly, the pulley 71 rotatably supported by the pulley support member 72 is movable between a first position P1 and a second position P2 shown in FIG. 4.

In addition, the tensioner mechanism 70 includes a coil spring (elastic member) 73 pressing the pulley support member 72 toward the vehicle body lower side (the lower side in FIG. 3) by a predetermined spring force (elastic force). The coil spring 73 is formed by a steel material, and the spring force is set to be a spring force capable of removing the slack of the pair of cables 23 and 24. The spring force of the coil spring 73 is not so large, which enables the tensioner mechanism 73 to operate smoothly.

The coil spring 73 is installed to a rod-like spring guide 72a (see FIG. 8) integrally provided at the pulley support member 72. In addition, as shown in FIG. 5, the coil spring 73 is provided between the sidewall part 51c of the drum housing 51 and the pulley support member 72 in a state of being compressed in a predetermined amount (a state in which an initial load is applied).

In addition, the tensioner mechanism 70 includes a lock member 72 which may set the pulley support member 72 to a "pulley locked state" and a "pulley unlocked state". The lock member 74 constitutes a fix member of the invention and is formed by a resin material such as plastics. As shown in FIGS. 5 and 6, the lock member 74 includes a swing shaft 74a, and the swing shaft 74a is rotatably provided to be sandwiched between the drum housing 51 and the drum cover 52. Accordingly, the lock member 74 is tiltably changed between the "pulley locked state" in which the lock member 74 stands upright as shown in FIG. 6 and the "pulley unlocked state" in which the lock member 74 is tilted in the direction of an arrow M4 of FIG. 6.

Here, the states shown in FIGS. 3 and 7 both indicate the state in which the lock member 74 stands upright. In such state, the lock member 74 and the pulley support member 72 are respectively engaged with each other. That is, in the state in which the lock member 74 stands upright, the pulley support member 72 comes to a state (pulley locked state) in which the movement thereof with respect to the drum housing 51 is limited. Specifically, the pulley support member 72 is unable to move in the direction of the arrow in a broken line shown in FIG. 4. Here, in FIGS. 3 and 8, in order to easily distinguish the lock member 74, shading is applied to the lock member 74.

Comparatively, as indicated by the arrow M4 in FIG. 8 or 6, when the lock member 74 is in the tilted state, the engagement between the lock member 74 and the pulley support member 72 is canceled, and the pulley support member 72 becomes movable (pulley unlocked state) with respect to the drum housing 51. Accordingly, the pulley support member 72 is pressed by the spring force of the coil spring 73 and moved toward the vehicle body lower side (the upper right side of FIG. 6). Accordingly, the slack of the pair of cables 23 and 24 is removed, and tension is applied to the pair of cables 23 and 24.

Here, in order to fix the lock member 74 firmly so that it does not rattle in the state in which the lock member 74 is tilted, a pair of fix claws 74b (only one of which is shown in FIGS. 5 and 6) provided at the lock member 74 are respectively hooked to a pair of hook parts 51e provided at the drum housing 51.

The "pulley locked state" is a state before the drive unit 30 is attached to the vehicle body 11 (see FIG. 2), that is, a vehicle mounting preparation state of the drive unit 30. In such case, as shown in FIG. 4, a rotation center C2 of the pulley 71 is disposed at a portion having a relatively short separation distance W1 to the rotation center C1 of the drum 60.

At this time, the lock member 74 resists the spring force of the coil spring 73 and keeps the coil spring 73 in a compressed state, and fixes the pulley 71 at the first position P1. Accordingly, compared with the state in which the drive unit 30 is usable, that is, the state in which the pulley 71 is at the second position P2, the pair of cables 23 and 24 can be loosened by a predetermined amount, so that the attachment of the drive unit 30 to the vehicle body 11 can be improved.

Comparatively, the "pulley unlocked state" is a state after the drive unit 30 is attached to the vehicle body 11, that is, a state in which the drive unit 30 is set to be usable. In such case, as shown in FIG. 4, the rotation center C2 of the pulley 71 is disposed at a portion having a separation distance W2 longer than the separation distance W1 to the rotation center C1 of the drum 60, that is, the rotation center C2 is disposed at a portion of the drum housing 51 closer to the lower part of the vehicle body (the lower part in the figure) (W2>W1).

Accordingly, in the state in which the lock member 74 stands upright, the pulley 71 is disposed at the position of the first position P1 (two-dot chain line) at which the open side cable 24 is loosened. In addition, in the state in which the lock member 74 is tilted, the pulley 71 is disposed at a position of the second position P2 (solid line) at which the slack of the open side cable 24 is removed.

Then, the pulley 71 is movable on an axial line C3 between the "pulley locked state" and the "pulley unlocked state". As shown in FIG. 4, the movement direction of the pulley 71 (the extending direction of the axial line C3) is substantially consistent with the direction in which the open side cable 24 is pulled out from the open side cable 24. Therefore, the slack of the open side cable 24 is efficiently removed. The side of the close side cable 23 is the same as the side of the open side cable 24.

Here, the coil spring 73 presses in a manner of positioning the pulley 71 to the second position P2 and applies tension to the pair of cables 23 and 24. Specifically, in the state in which the drive unit 30 is usable, the pair of cables 23 and 24 are each in a state of being constantly applied with tension by the spring force of the coil spring 73. The "stretching" of the pair of cables 23 and 24 due to long-term use of the drive unit 30 is absorbed, and, at the time when the drive unit 30 operates, the rattling of the slide door 13 is effectively suppressed.

As shown in FIGS. 3 and 6, the limiting member 80 allowing or limiting the rotation of the drum 60 is movably provided in the drum housing 51 and between the drum 60 and the lock member 74. The limiting member 80 is formed in an elongated plate shape by press-processing a stainless steel plate. Here, in FIGS. 5 and 8, in order to easily distinguish the limiting member 80, shading is applied to the limiting member 80.

The limiting member 80 includes a body part 81. The body part 81 is slidably installed to a groove 51f provided in the drum housing 51. Here, the groove 51f is provided to extend between the drum 60 and the lock member 74.

Accordingly, the limiting member 80 is movable between the drum 60 and the lock member 74.

In addition, the engagement convex part 81a inserted into and engaged with the engagement concave part 62b provided in the drum 60 is integrally provided at an end (an end near the drum 60) in the longitudinal direction of the body part 81. The engagement convex part 81a is provided to protrude in the plate thickness direction with respect to the body part 81. Specifically, the engagement convex part 81 protrudes toward the bottom wall part 51b of the drum housing 51 by bending one end side in the longitudinal direction of the body 81.

In addition, a press part 81b pressed by the lock member 74 at the time when the lock member 74 is tilted is integrally provided on the other end of the body part 81 in the longitudinal direction (the other end near the lock member 74). The press part 81b, like the engagement convex part 81a, is provided to protrude in the plate thickness direction of the body part 81. Specifically, the press part 81b protrudes toward the bottom wall part 51b of the drum housing 51 by bending the other end side of the body 81 in the longitudinal direction.

Then, the press part 81b extends to the vicinity of the coil spring 73 forming the tensioner mechanism 70 and is pressed by a press plane part 74c provided at the lock member 74. Here, the press part 81b is provided to tilt toward the bottom wall part 51b at a predetermined angle. Accordingly, at the time when the lock member 74 is tilted, through the press plane part 74c of the lock member 74, the limiting member 80 is moved toward the drum 60 (see an arrow M7 of FIG. 8).

In addition, a position determining part 81c determining a fixed position of the limiting part 80 with respect to the drum housing 51 is integrally provided between the engagement convex part 81a and the press part 81b of the body part 81. The position determining part 81c protrudes in a direction intersecting with the extending direction of the body part 81. Specifically, the position determining part 81c protrudes in the width direction of the body part 81 orthogonal to the plate thickness direction of the body part 81.

A position determining protrusion 81d protruding in the plate thickness direction of the position determining part 81c is formed at the position determining part 81c. The position determining protrusion 81d is selectively fit with a first position determining hole 52b and a second position determining hole 52c (see FIG. 4) provided in the drum cover 52. That is, as shown in FIG. 4, the limiting member 80 is movably by a distance L1 between a first state P3 in which the position determining protrusion 81d is fit with the first position determining hole 52b and a second state P4 in which the position determining protrusion 81d is fit with the second position determining hole 52c. The distance L1 within which the limiting member 80 is movable is shorter than a distance L2 within which the pulley 71 is movable (L1<L2).

Here, the position determining protrusion 81d provided in the limiting member 80 and the first position determining hole 52b and the second position determining hole 52c provided in the drum cover 52 constitute a holding mechanism of the invention. That is, the holding mechanism is provided between the drum cover 52 and the limiting member 80, and is able to hold the limiting member 80 between the position of the first state P3 and the position of the second state P4, respectively. Accordingly, for example, during conveyance of the drive unit 30 (vehicle mounting preparation state) or during use of the drive unit 30 (usable state), a wild motion (rattling) of the limiting member 80 in the drum housing 51 is suppressed.

Then, at the time of the "pulley locked state" in which the lock member 74 stands upright, the limiting member 80 is disposed in default at the position of the first state P3 in which the position determining protrusion 81d is fit with the first position determining hole 52b. At this time, the engagement convex part 81a of the limiting member 80 is in a state of being inserted into and engaged with the engagement concave part 62b of the drum 60. That is, the rotation of the drum 60 is limited. Accordingly, the drive unit 30 of the embodiment is in the "drum locked state" at the time of the "pulley locked state".

Comparatively, by tilting the lock member 74 to change to the "pulley unlocked state", the limiting member 80 is disposed at the position of the second state P4 in which the position determining protrusion 81d is fit with the second position determining hole 52c. At this time, the engagement convex part 81a of the limiting member 80 is in a state of being disentangled from the engagement concave part 62b of the drum 60 to cancel the engagement. That is, the rotation of the drum 60 is allowed. Accordingly, the drive unit 30 of the embodiment is in the "drum unlocked state" at the time of the "pulley unlocked state".

Then, the method for attaching the drive unit 30 formed as the above to the vehicle body 11 is described in detail with reference to the drawings.

Firstly, at the final stage in the process of assembling the drive unit 30, the drive unit 30 is set to the "vehicle mounting preparation state". Specifically, as shown in FIG. 6, the lock member 74 is operated in a direction to set to the state of standing upright, and the lock member 74 and the pulley support member 74 are in the state of being engaged with each other. Accordingly, as indicated by an arrow M1 of FIG. 7, the coil spring 73 is changed to the state of being compressed, and the pulley 71 is changed to the state of being fixed at the first position P1. Accordingly, the pulley 71 becomes unmovable on the axial line C3, and the tensioner mechanism 70 is changed to the "pulley locked state".

Since the same operation is performed on the side of the close side cable 23 and the side of the open side cable 24, repetitive descriptions will be omitted.

Then, the limiting member 80 is moved to a direction indicated by an arrow M2 of FIG. 7. Accordingly, the engagement convex part 81a of the limiting member 80 is inserted into the engagement concave part 62b of the drum 60. At this time, the position determining protrusion 81d of the limiting member 80 is fit with the first position determining hole 52b (see FIG. 4) of the drum cover 52. Accordingly, the position of the limiting member 80 is determined at the position of the first state P3, and the drum 60 is changed to the state in which the rotation thereof is limited (not rotatable), i.e., the "drum locked state".

Accordingly, at the final stage in the process of assembling the drive unit 30, as the "pulley locked state" and the "drum locked state", the drive unit 30 comes to the vehicle mounting preparation state. Here, the process of setting the drive unit 30 to the vehicle mounting preparation state as the "pulley locked state" and the "drum locked state" constitutes the first process of the invention.

Then, the drive unit 30 set to the vehicle mounting preparation state is attached to the vehicle body panel forming the vehicle body 11 (see FIG. 2), which is the attachment object, in the vehicle mounting preparation state. Here, by using three fix bolts (not shown), the drive unit 30 is firmly fixed to the vehicle body 11.

Then, through the process of setting to the vehicle mounting preparation state, as shown in the arrow M3 of FIG. 7, the end parts on one side of the pair of cables 23 and 24, which are loosened, in the longitudinal direction are respectively connected to the roller assembly 15 (see FIG. 2) constituting a portion of the slide door 13. Here, the end parts on one side of the pair of cables 23 and 24 in the longitudinal direction are respectively fixed by piece members (not shown). The piece members are respectively hooked to the installation part (not shown) of the roller assembly 15.

Accordingly, with the pair of cables 23 and 24 being respectively loosened, the end parts on one side of the pair of cables 23 and 24 in the longitudinal direction can be respectively easily connected with the roller assembly 15.

Here, the process of attaching the drive unit 30 to the vehicle body panel forming the vehicle body 11 and the process of respectively connecting the pair of cables 23 and 24 to the roller assembly 15 constitute the second process of the invention.

Then, an operation of setting the drive unit 30 in the vehicle mounting preparation state to the "usable state" is performed. Specifically, as shown in the arrow M4 in FIG. 6, a process of operating the lock member 74 standing upright in the other direction to tilt the lock member 74 is executed. At this time, the lock member 74 is pressed with a relatively large press force.

The engagement between the lock member 74 and the pulley support member 72 is canceled, and the pulley support member 72 is moved as indicated by an arrow M5 in FIG. 6 by the spring force of the coil spring 73. That is, the tensioner mechanism 70 is set to the "pulley unlocked state". More specifically, as indicated by the arrow M5 of FIG. 8, the pulley 71 is moved by the spring force of the coil spring 73 on the axial line C3 and is moved from the position of the first position P1 to the position of the second position P2. Accordingly, the pair of cables 23 and 24 which are loosened are applied with tension indicated by an arrow M6 of FIG. 8 to remove the slack of the pair of cables 23 and 24.

Substantially at the same time, the press plane part 74c (see FIG. 6) of the lock member 74 moves to slide on the press part 81b of the limiting member 80. Accordingly, as indicated by the arrow M7 of FIGS. 6 and 8, the limiting member 80 moves in the other direction.

Then, the pair of fix claws 74b (see FIG. 6) provided in the lock member 74 are respectively hooked to the pair of hook parts 51e (see FIG. 6) provided in the drum housing 51. At substantially the same time with the operation, the position determining protrusion 81d of the limiting member 80 is fit with the second position determining hole 52c (see FIG. 4). Accordingly, the position of the limiting member 80 is determined at the position of the second state P4, the engagement convex part 81a of the limiting member 80 is disentangled from the engagement concave part 62b of the drum 60, and the engagement therebetween is canceled.

Therefore, with the rotation of the drum 60, the engagement convex part 81a is slidable on a circular track T on the recess part 62 and, and the drum 60 is changed to a state in which rotation is allowed (rotatable), that is, the "the drum unlocked state". Accordingly, the drive unit 30 is changed to the usable state.

By doing so, in association with the operation of the lock member 74 to the other direction, the limiting member 80 is also moved in the other direction. In other words, by operating the lock member 74 to the other direction once, the drive unit 30 in the vehicle mounting preparation state can be set to the "pulley unlocked state" and the "drum unlocked state". Thus, the drive unit 30 is easily set to the usable state, and the operability of attaching the drive unit 30 to the vehicle body 11 is improved.

Accordingly, the process of setting the tensioner mechanism 70 to the "pulley unlocked state" and setting the drum 60 to the "drum unlocked state" to set the drive unit 30 to the usable state constitutes the third process of the invention.

As explicated above, according to the drive unit 30 according to the embodiment, the limiting member 80 limits the rotation of the drum 60 at the time when the lock member 74 fixes the pulley 71 at the first position P1 and allows the rotation of the drum 60 at the time when the coil spring 73 moves the pulley 71 to the second position P2. Therefore, in the state before the drive unit 30 is attached to the vehicle body 11 (vehicle mounting preparation state), the drum 60 can be set to be not rotatable.

Accordingly, it is possible to prevent the pair of cables 23, 24 inside the drum housing 51 from loosening and catching on other constituent components. Accordingly, it is possible to improve the operability of attaching the drive unit 30 to the vehicle body 11.

In addition, according to the drive unit 30 according to the embodiment, the engagement convex part 81a engaged with the engagement concave part 62b provided in the drum 60 is provided on one end of the limiting part 80 near the drum 60 in the longitudinal direction, and the press part 81b pressed by the lock member 74 is provided on the other end of the limiting member 80 near the lock member 74 in the longitudinal direction. At the time when the press part 81b is pressed by the lock member 74 to move the limiting member 80, the engagement between the engagement convex part 81a and the engagement concave part 62b is canceled to allow the rotation of the drum 60.

Accordingly, by operating the lock member 74 just once, the drive unit 30 can be set to the "pulley unlocked state" and the "drum unlocked state". Accordingly, the drive unit 30 can be easily set to the usable state from the vehicle mounting preparation state, and the operability of attaching the drive unit 30 to the vehicle body 11 can be improved.

In addition, according to the drive unit 30 according to the embodiment, the position determining protrusion 81b and the first position determining hole 52b and the second position determining hole 52c capable of holding the limiting member 80 between the first state P3 limiting the rotation of the drum 60 or the second state P4 allowing the rotation of the drum 60 are provided between the drum cover 52 and the limiting member 80.

Accordingly, at the time when the drive unit 30 is in the vehicle mounting preparation state or at the time when the drive unit 30 is in the usable state, a wild motion or rattling of the limiting member 80 in the drum housing 51 can be reliably prevented.

It goes without saying that the invention is not limited to the above-described embodiment, and various modifications can be made without departing from the gist thereof. For example, in the above embodiment, the electric motor 42 is shown as one adopting a flat-shaped brushless motor. However, the invention is not limited thereto. An electric motor with a brush or other types of electric motors may also be adopted.

In addition, in the above embodiment, a total of six protrusion parts 62a are provided in the drum 60, and relatively large engagement concave parts 62b is provided between adjacent protrusion parts 62a. Specifically, as shown in FIG. 7, the width dimension of the engagement concave part 62b along the circumferential direction of the drum 60 is substantially three times of the width dimension of the body part 81 of the limiting member 80. However, the invention is not limited thereto. The number of the protrusion part 62a may be increased to provide an engagement concave part having a width dimension slightly greater than the width dimension of the body part 81. In such case, in the vehicle mounting preparation state of the drive unit 30, the rattling of the drum 60 can be further suppressed, and the slack of the pair of cables 23 and 24 in the drum housing 51 can also be further suppressed.

In addition, the materials, shapes, dimensions, numbers, installation locations, etc. of each component in the above embodiment are arbitrary as long as the invention can be achieved, and are not limited to the above embodiment.

REFERENCE SIGNS LIST

- 10: Vehicle
- 11: Vehicle body (attachment object)
- 12: Opening part
- 13: Slide door (open/close body)
- 14: Guide rail
- 14a: Curved part
- 15: Roller assembly
- 20: Slide door open/close mechanism
- 21, 22: Inversion pulley
- 23: Close side cable (cable)
- 24: Open side cable (cable)
- 25, 26: Outer casing
- 30: Drive unit
- 40: Motor part
- 41: Motor housing
- 42: Electric motor
- 50: Drum part
- 51: Drum housing (housing)
- 51a: Housing opening part
- 51b: Bottom wall part
- 51c: Sidewall part
- 51d: First guide groove
- 51e: Hook part
- 51f: Groove
- 52: Drum cover (housing)
- 52a: Second guide groove
- 52b: First position determining hole (holding mechanism)
- 52c: Second position determining hole (holding mechanism)
- 60: Drum
- 61a, 61b: Cable groove
- 62: Recess part
- 62a: Protrusion part
- 62b: Engagement concave part
- 70: Tensioner mechanism
- 71: Pulley
- 72: Pulley support member
- 72a: Spring guide
- 73: Coil spring (elastic member)
- 74: Lock member (fix member)
- 74a: Swing shaft
- 74b: Fix claw
- 74c: Press plane part
- 80: Limiting member
- 81: Body part
- 81a: Engagement convex part
- 81b: Press part
- 81c: Position determining part
- 81d: Position determining protrusion (holding mechanism)
- P1: First position
- P2: Second position
- P3: First state
- P4: Second state
- S1, S2: Fastening member

What is claimed is:

1. A drive unit, configured to drive an open-and-close body between opened and closed positions, comprising:
a cable, a portion of which is connected to and adapted to pull the open-and-close body;
a drum, having another portion of the cable wound thereon;
a pulley, provided between the open-and-close body and the drum, changing a direction of the cable, and being movable between a first position where the pulley is engaged with the cable and the cable is slack and a second position where the pulley engages the cable and tensions the cable;
a fix member, capable of fixing the pulley in the first position;
an elastic member, urging the pulley towards the second position and tensing the cable; and
a limiting member, provided between the drum and the fix member, and allowing or limiting rotation of the drum, wherein when the fix member fixes the pulley in the first position, the limiting member limits the rotation of the drum, and when the fix member is moved to release the elastic member which moves the pulley to the second position, the limiting member moves to allow the rotation of the drum.

2. The drive unit as claimed in claim 1, wherein the limiting member includes an engagement convex part at one end thereof for selective engagement with an engagement concave part provided in the drum, the limiting member further includes a press part at another end thereof, and
when the press part is pressed by the fix member and moves the limiting member, an engagement between the engagement convex part and the engagement concave part is cancelled to allow the rotation of the drum.

3. The drive unit as claimed in claim 2, wherein the drive unit is further provided with a housing accommodating the limiting member, a holding mechanism is provided between the housing and the limiting member, and the holding mechanism is capable of holding the limiting member in a first state in which the rotation of the drum is limited or a second state in which the rotation of the drum is allowed.

4. The drive unit as claimed in claim 1, wherein the drive unit is further provided with a housing accommodating the limiting member, a holding mechanism is provided between the housing and the limiting member, and the holding mechanism is capable of holding the limiting member in a first state in which the rotation of the drum is limited or a second state in which the rotation of the drum is allowed.

* * * * *